United States Patent
Persson et al.

(10) Patent No.: US 9,743,318 B2
(45) Date of Patent: Aug. 22, 2017

(54) METHODS, RADIO NETWORK NODE AND MOBILE STATION, FOR SUPPORTING INTER-RAT HANDOVER

(71) Applicant: Telefonaktiebolaget L M Ericsson (publ), Stockholm (SE)

(72) Inventors: Claes-Göran Persson, Mjölby (SE); Ravitej Ballakur, Bangalore (IN); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/781,833

(22) PCT Filed: Mar. 31, 2014

(86) PCT No.: PCT/SE2014/050383
§ 371 (c)(1),
(2) Date: Oct. 1, 2015

(87) PCT Pub. No.: WO2014/163561
PCT Pub. Date: Oct. 9, 2014

(65) Prior Publication Data
US 2016/0057662 A1    Feb. 25, 2016

Related U.S. Application Data

(60) Provisional application No. 61/808,427, filed on Apr. 4, 2013.

(51) Int. Cl.
*H04W 52/24* (2009.01)
*H04W 4/00* (2009.01)
(Continued)

(52) U.S. Cl.
CPC ......... *H04W 36/0022* (2013.01); *H04W 8/24* (2013.01); *H04W 28/06* (2013.01); *H04W 36/0016* (2013.01); *H04W 36/0066* (2013.01)

(58) Field of Classification Search
CPC .... H04W 52/241; H04W 4/008; H04W 16/14
See application file for complete search history.

(56) References Cited

U.S. PATENT DOCUMENTS

| | | | | |
|---|---|---|---|---|
| 2004/0009770 | A1* | 1/2004 | Sivanandan | H04W 28/18 455/425 |
| 2007/0224990 | A1* | 9/2007 | Edge | H04W 8/24 455/436 |
| 2013/0177000 | A1* | 7/2013 | Abraham | H04W 28/06 370/338 |

FOREIGN PATENT DOCUMENTS

| | | |
|---|---|---|
| EP | 2182758 A2 | 5/2010 |
| WO | 0111911 A1 | 2/2001 |

OTHER PUBLICATIONS

Unknown, Author, "3GPP TS 25.331 V11.4.0", 3rd Generation Partnership Project; Technical Specification Group Radio Access Network; Radio Resource Control (RRC); Protocol specification (Release 11), Dec. 2012, pp. 1-2056.
(Continued)

*Primary Examiner* — Christopher M Brandt
(74) *Attorney, Agent, or Firm* — Muphy, Bilak & Homiller, PLLC (57) ABSTRACT

Support of handover of a wireless device (110) from a first Radio Access Network, "RAN", (101) of a first Radio Access Technology, "RAT", to a second RAN (111) of a second RAT that is different from the first RAT. Said RATs being supported by the wireless device (110). A first radio network node (102) is comprised in the first RAN (101) and said RANs (101, 111) are comprised in a cellular radio system (100). The first radio network node (102) sends (201; 301), to the wireless device (110), a request to return a compressed version of RAT capability information. The
(Continued)

RAT capability information is associated with the wireless device (110) and at least one of the first RAT and the second RAT.

28 Claims, 4 Drawing Sheets

(51) Int. Cl.
  *H04W 16/14* (2009.01)
  *H04W 36/00* (2009.01)
  *H04W 8/24* (2009.01)
  *H04W 28/06* (2009.01)

(56) References Cited

OTHER PUBLICATIONS

Unknown, Author, "3GPP TS 25.413 V11.0.0", 3rd Generation Partnership Project; Technical Specification Group Radio Access Network; UTRAN Iu interface Radio Access Network Application Part (RANAP) signalling (Release 11), Dec. 2012, pp. 1-440.

Unknown, Author, "3GPP TS 44.006 V11.0.0", 3rd Generation Partnership Project; Technical Specification Group GSM/EDGE Radio Access Network; Mobile Station—Base Station System (MS-BSS) interface; Data Link (DL) layer specification (Release 11), Sep. 2012, pp. 1-60.

Unknown, Author, "3GPP TS 44.018 V11.3.0", 3rd Generation Partnership Project; Technical Specification Group GSM/EDGE Radio Access Network; Mobile radio interface layer 3 specification; Radio Resource Control (RRC) protocol (Release 11), Nov. 2012, pp. 1-465.

Unknown, Author, "3GPP TS 48.006 V11.0.0", 3rd Generation Partnership Project; Technical Specification Group GSM/EDGE Radio Access Network; Signalling transport mechanism specification for the Base Station System—Mobile-services Switching Centre(BSS-MSC) interface (Release 11), Sep. 2012, pp. 1-37.

Unknown, Author, "3GPP TS 48.008 V11.3.0", 3rd Generation Partnership Project; Technical Specification Group GSM/EDGE Radio Access Network; Mobile Switching Centre—Base Station System (MSC-BSS) interface; Layer 3 specification (Release 11), Nov. 2012, pp. 1-227.

Unknown, Author, "ERSI TS 144 018 V11.4.0", Digital cellular telecommunications system (Phase 2+); Mobile radio interface layer 3 specification; Radio Resource Control (RRC) protocol (3GPP TS 44.018 version 11.4.0 Release 11), Apr. 2013, pp. 1-469.

Unknown, Author, "Reporting UE E-UTRA Radio Access Capabilities in CS Domain", 3GPP TSG-GERAN Meeting #55, GP-120955, Huawei Technologies Co., Ltd., Vienna Austria, Aug. 27-31, 2012, pp. 1-14.

* cited by examiner

Fig. 8c

METHODS, RADIO NETWORK NODE AND MOBILE STATION, FOR SUPPORTING INTER-RAT HANDOVER

TECHNICAL FIELD

Embodiments herein relate to methods, a radio network node and a mobile station, for supporting a handover of the mobile station from a first Radio Access Network (RAN) of a first Radio Access Technology (RAT), to a second RAN of a second RAT that is different from the first RAT. The RANs are comprised in a cellular radio system, such as a telecommunications system.

BACKGROUND

Communication devices such as wireless devices are also known as e.g. User Equipments (UEs), mobile terminals, wireless terminals and mobile stations. Wireless devices are enabled to communicate wirelessly in a cellular communication network, wireless communication network or wireless communications system, sometimes also referred to as a cellular radio system or a cellular network. The communication may be performed, e.g., between two wireless devices, between a wireless device and a regular telephone and/or between a wireless device and a server via a Radio Access Network (RAN), and possibly one or more core networks, comprised within the cellular communication network.

Wireless devices may further be referred to as mobile telephones, cellular telephones, laptops, or tablet computer with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communication network covers a geographical area which is divided into cell areas, wherein each cell area being served by an access node such as a base station, e.g., a Radio Base Station (RBS), which sometimes may be referred to as e.g. "eNB", "eNodeB", "NodeB", "B node", "node B" or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile). In 3rd Generation Partnership Project (3GPP) Long Term Evolution (LTE), base stations, which may be referred to as eNodeBs, eNBs or even NBs, may be directly connected to other base stations and may be directly connected to one or more core networks.

The 3GPP LTE radio access standard has been written in order to support high bitrates and low latency both for uplink and downlink traffic. All data transmission is in LTE controlled by the base stations.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression Downlink (DL) may be used for the transmission path, or send direction, from a base station to a mobile station. The expression Uplink (UL) may be used for the transmission path, or send direction, in the opposite direction, i.e. from a mobile station to a base station.

Cellular radio systems continue to evolve. Much of the evolvement is driven and standardized by the third generation partnership project (3GPP). One important feature is support of multiple Radio Access Technologies (RATs) and handover of wireless devices between different RATs, i.e. inter-RAT handover, involving RANs of different RATs, e.g. handover from GSM EDGE Radio Access Network (GERAN) to Universal Terrestrial Radio Access Network (UTRAN). However, an inter-RAT handover may fail for various reasons and it is of present and future interest to ensure that this will not happen, or at least reduce the risk of such failure.

SUMMARY

In view of the above, an object of embodiments herein is to provide improvements with regard to inter-RAT handover in cellular radio systems, and in particular between GERAN and UTRAN.

According to a first aspect of embodiments herein, the object is achieved by a method, performed by a first radio network node, for supporting a handover of a wireless device from a first Radio Access Network (RAN) of a first Radio Access Technology (RAT) to a second RAN of a second RAT that is different from the first RAT. Said RATs being supported by the wireless device. Said first radio network node is comprised in the first RAN and said RANs are comprised in a cellular radio system. The first radio network node sends, to the wireless device, a request to return a compressed version of RAT capability information. The RAT capability information being associated with the wireless device and at least one of the first RAT and the second RAT.

According to a second aspect of embodiments herein, the object is achieved by a computer program comprising instructions that when executed by a processing circuit causes the first radio network node to perform the method according to the first aspect.

According to a third aspect of embodiments herein, the object is achieved by a data carrier comprising a computer-readable medium storing a computer program according to the third aspect.

According to a fourth aspect of embodiments herein, the object is achieved by a method, performed by a wireless device, for supporting a handover of the wireless device from a first RAN of a first RAT, to a second RAN of a second RAT that is different from the first RAT. Said RATs being supported by the wireless device. Said RANs are comprised in a cellular radio system. The wireless device receives, from a first radio network node comprised in the first RAN, a request to return a compressed version of RAT capability information. The RAT capability information being associated with the wireless device and at least one of the first RAT and the second RAT.

According to a fifth aspect of embodiments herein, the object is achieved by a computer program comprising instructions that when executed by a processing circuit causes the wireless device to perform the method according to the fourth aspect.

According to a sixth aspect of embodiments herein, the object is achieved by a data carrier comprising a computer-readable medium storing a computer program according to the fifth aspect.

According to a seventh aspect of embodiments herein, the object is achieved by a first radio network node for supporting a handover of a wireless device from a first RAN of a first RAT, to a second RAN of a second RAT that is different from the first RAT. Said RATs being supported by the wireless device. Said first radio network node is comprised in the first RAN and said RANs are being comprised in a cellular radio system. The first radio network node is configured to send, to the wireless device, a request to return a compressed version of RAT capability information. The RAT capability information being associated with the wireless device and at least one of the first RAT and the second RAT.

According to an eight aspect of embodiments herein, the object is achieved by a wireless device for supporting a handover of the wireless device from a first RAN of a first RAT to a second RAN of a second RAT that is different from the first RAT. Said RATs being supported by the wireless device. Said RANs are comprised in a cellular radio system. The wireless device receives, from a first radio network node comprised in the first RAN, a request to return a compressed version of RAT capability information. The RAT capability information being associated with the wireless device and at least one of the first RAT and the second RAT.

Conventionally, inter-RAT handover of a wireless device, e.g. from the above-mentioned first RAN to the second RAN, is supported by providing a conventional, uncompressed, version of RAT capability information regarding the wireless device to the second RAN. This is done before or in connection with the handover, However, the conventional, uncompressed version of the RAT capability information may cause handover failure due to problems in reaching the second network node when/if the conventional, uncompressed version of the RAT capability information is too large in data size, e.g. beyond some limit. Such inter-RAT handover failure may be avoided, or at least the risk of such failure is reduced, by requesting the compressed version of RAT capability information as in embodiments herein. The compressed version of the RAT capability information is by definition of smaller data size than an uncompressed version of the same RAT capability information and may therefore be sent to and reach the second radio network node in situations where the uncompressed version would not succeed to reach the second radio network node and thereby would cause handover failure.

Embodiments herein may be of particular interest when the first RAT is GERAN and the second RAT is UTRAN, or vice versa.

BRIEF DESCRIPTION OF THE DRAWINGS

Examples of embodiments herein are described in more detail with reference to the appended schematic drawings.

DETAILED DESCRIPTION

Embodiments herein are based on utilizing a compressed version of Radio Access Technologies (RAT) capability information to provide improvements with regard to inter-RAT handover in cellular radio systems. The RAT capability is with regard to a wireless device or UE and may be referred to as UE RAT capability. However, before presenting details regarding the embodiments herein, and as part of the development towards these embodiments, the situation and problem indicated in the Background will be further discussed.

When an inter-Radio Access Technology (inter-RAT) handover from GSM EDGE Radio Access Network (GERAN) to Universal Terrestrial Radio Access Network (UTRAN) is triggered, the User Equipment (UE) Universal Terrestrial Radio Access (UTRA) capabilities shall be included in the Source Radio Network Controller (RNC) to target RNC transparent information (UMTS) Information Element in the Base Station Subsystem Management Application Part (BSSMAP) HANDOVER REQUIRED message sent from the source BSC to the target RNC via the core network, as specified in section 3.2.1.9 of 3GPP Technical Specification TS 48.008, version 11.3.0, in order to allocate the correct radio resources in the target RNC.

Also when an inter-RAT handover from UTRAN to GERAN is performed, the UE UTRA capabilities are included in the Old Base Station Subsystem (BSS) to New BSS Information Element (IE) in the RELOCATION REQUIRED message, see section 9.1.9 in 3GPP TS 25.413, version 11.2.0, sent from the source RNC to the core network and further to the target BSC in the BSSMAP HANDOVER REQUEST message, see section 3.2.1.8 in 3GPP TS 48.008, version 11.3.0.

However during the last years the UE UTRA capabilities of a UTRAN and GERAN capable mobile station has grown in size beyond a limit which potentially makes it impossible to transfer them over the so called GERAN Circuit Switched (CS) radio interface between the mobile station and the BTS or over the so called A-interface between the BSC and the core network.

If the UE UTRA capabilities due to its size cannot be sent over the GERAN CS radio interface or in the BSSMAP HANDOVER REQUIRED message over the A-interface, the Inter-RAT handover to UTRAN will fail.

Likewise, if the size of the UE UTRA capabilities is too large to be sent in the BSSMAP HANDOVER REQUEST message over the A-interface, the Inter-RAT handover from UTRAN to GERAN will fail.

The size of the UE UTRA capabilities for a UTRAN and GERAN capable mobile station may e.g. be too large to be sent over the GERAN CS radio interface. The maximum size of an L3 message sent over the GERAN CS radio interface is 251 octets as defined in 3GPP TS 44.006, version 11.0.0, section 8.8.5. The maximum size of the UE UTRA capabilities is defined in 3GPP TS 25.331, version 11.4.0.

Even if the UE UTRA capabilities are not too large to be sent over the GERAN CS radio interface, they might be too large to be sent over the A-interface either (1) when included in the BSSMAP HAN DOVER REQUIRED message when performing an Inter-RAT handover from GERAN to UTRAN, or (2) when being included in the BSSMAP HANDOVER REQUEST message when performing an inter-RAT handover from UTRAN to GERAN. The maximum size of a BSSMAP message sent on the A-interface is 255 octets since the length indicator, indicating the number of octets in the BSSMAP message, consist of only 1 octet as defined in 3GPP TS 48.006, version 11.0.0, section 9.3.3 but the available space for the UE UTRA capabilities in these two BSSMAP messages is much less since other inter-RAT related information also requires considerable amount of space.

In conclusion, there may be an increased probability of inter-RAT handover to fail on Release 10 (and higher) release compliant mobile stations.

Also, as per 3GPP TS 44.018, version 11.3.0, a compressed format of the UE UTRA capabilities may be sent over the GERAN CS radio interface, however, the mobile station is only enabled to send compressed UE UTRA capabilities to the network if requested by the Base Station Controller (BSC) in an Immediate Assignment procedure during the call establishment phase. This requires that the UE UTRA capabilities need to be stored in the BSC during the life-time of the call although no inter-RAT handover to UTRAN may be performed. The problem gets compounded in case of inter-BSC handover between one or more BSCs as the UE UTRA capabilities need to be transferred across all the BSCs.

When performing an Inter-RAT handover from GERAN to UTRAN, the UE UTRA capabilities are sent in the Source RNC to target RNC transparent information (UMTS) Information Element (IE) as part of the BSSMAP HANDOVER REQUIRED message, as defined in 3GPP TS 48.008, version 11.3.0, section 3.2.1.9. If the UE UTRA capabilities due to its size cannot be uploaded to the BSC from the mobile station and hence cannot be included in the BSSMAP HANDOVER REQUIRED message, the Inter-RAT handover from GERAN to UTRAN will fail.

The INTER RAT HANDOVER INFO message and the optional UE Radio Access Capability Compressed IE (i.e. compressed UE UTRA capabilities) is defined in TS 25.331, version 11.4.0, section 10.2.16d, in purpose to minimize segmentation of the UTRAN CLASSMARK CHANGE message (sent from a UTRAN capable mobile station to the BSC in the early classmark sending), and hence to reduce the call setup time in GERAN. This is existing 3GPP functionality since Release-5.

The request for the compressed version of INTER RAT HANDOVER INFO is conventionally only allowed be sent in an IMMEDIATE ASSIGNMENT message or in an IMMEDIATE ASSIGNMENT EXTENDED message, which are sent during the call establishment phase. However, a legacy Classmark interrogation procedure, see TS 44.018, version 11.3.0, section 3.4.11, allows the network to request for additional classmark information from a mobile station when the information initially sent by the mobile station during the Immediate Assignment procedure is not sufficient for network decisions, e.g. in order to prepare an Inter-RAT handover to another RAT.

Likewise, even if the UE UTRA capabilities can be uploaded from the mobile station, they might still be too large to be included in the BSSMAP HANDOVER REQUIRED message (as defined in TS 48.008, version 11.3.0, section 3.2.1.9) with a failed Inter-RAT handover to UTRAN as a result. This is due to the available space for the UE UTRA capabilities is less than 190 octets in the BSSMAP HANDOVER REQUIRED message.

Similar to the case above, when an inter-RAT handover from UTRAN to GERAN is performed the UE UTRA capabilities are sent from the source RNC to the Core Network (CN) in the RELOCATION REQUIRED message (as defined in 3GPP TS 25.413, version 11.2.0, section 9.1.9), and further from the CN to the target BSC in the BSSMAP HANDOVER REQUEST message (as defined in TS 48.008, version 11.3.0, section 3.2.1.8). If the UE UTRA capabilities are too large to be included in the BSSMAP HANDOVER REQUEST message (due to the BSSMAP size limitation), the sending of the message in the CN will fail. Consequently the inter-RAT handover from UTRAN to GERAN will also fail.

Figure 1:
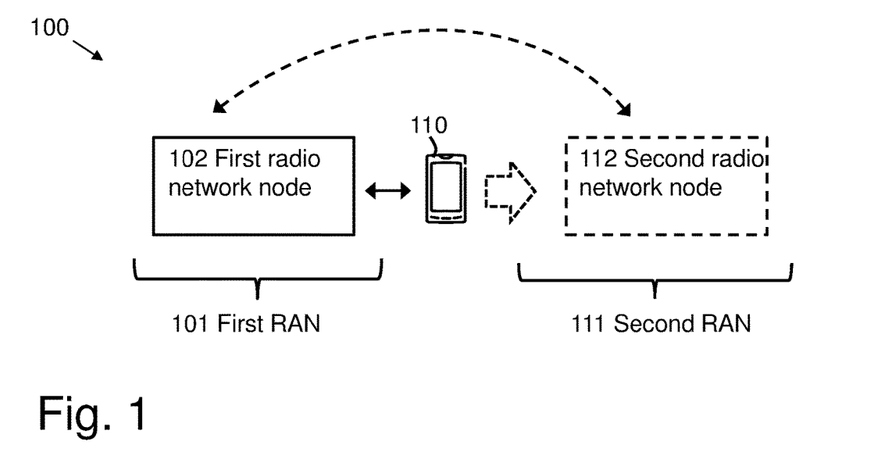
FIG. 1 is a schematic block diagram schematically depicting an example of a cellular radio system relevant for embodiments herein.

FIG. 1 is a schematic block diagram schematically depicting an example of a cellular radio system 100, relevant for embodiments herein, in a simplified view. The cellular radio system 100 comprises a first RAN 101 of a first RAT. The first RAN 101 comprises a first radio network node 102 that e.g. may be a base station or a controlling node of a base station. In some embodiments, the first RAN 101 is a GERAN and the first radio network node 102 is a BSC, i.e. a controlling node of one or more BTSs, i.e. base stations in GSM and GERAN, which BSC and BTSs typically are part of a so called Base Station Subsystem (BSS). When the first RAN 101 is the GERAN and thus the first radio network node 102 is the controlling node being the BSC, the first RAN 101 additionally comprise at least a BTS (not shown) controlled by the BSC. In other words, the first RAN 101 may be a GERAN comprising a BSS where the first network node 101 is the BSC of the BSS. In case the BSS as such is considered a radio network node, the first network node 102 may be the BSS. The cellular radio system 100 may be a combined system with multiple RATs.

The figure further shows a wireless device 110, e.g. a mobile station or UE, that may be served by the first radio network node 102. In some examples, the wireless device 110 may be attached to, i.e. camps on, the first radio network node 102.

The cellular radio system 100 further comprises a second RAN 111 of a second RAT that is different from the first RAT, i.e. use different radio access technologies. That is, the first RAN 101 and the second RAN 111 are of different types, e.g. GERAN and UTRAN. Further, the second RAN 111 comprises a second radio network node 112 that may be a base station or a controlling node of a base station. In some embodiments, the second RAN 111 is a UTRAN and the second radio network node 112 is a RNC, i.e. a controlling node of one or more NBs, i.e. base stations in UMTS and UTRAN. When the second RAN 111 is the UTRAN and thus the second radio network node 112 is the controlling node 112 being the RNC, the second RAN 111 thus additionally comprise at least a NB (not shown) controlled by the RNC.

Hence, in some embodiments herein, the first RAN 101 is a GERAN with the first radio network node 102 being a BSC, and the second RAN 111 is a UTRAN with the second radio network node 112 being a RNC. In other embodiments herein, the first RAN 101 is a UTRAN with the first radio network node 102 being a RNC, and the second RAN 111 is a GERAN with the second radio network node 112 being a BSC.

Note that although they may be logically different nodes, the first radio network node 102 and the second radio network node 112 may be physically co-located or even integrated in the same system or device, e.g. implementing controlling nodes and/or base stations involved.

Moreover, the first radio network node 102 and the second radio network node 112 may be communicatively connected via one or more core networks (not shown) of the cellular radio system 100, e.g. one core network associated with the first RAN 101 and another core network associated with the second RAN 111. When, as mentioned above, the first RAN 101 is GERAN and the radio network node 102 is a BSC, communication with the first radio network node 102, e.g. to and/or from the second radio network node 112, takes place over the above-mentioned A-interface.

The wireless device 110 supports the first RAT and the second RAT, i.e. different RATs, or in other words multiple RATs, or "multi-RAT", meaning that the wireless device 110 is compatible with and may operate and/or be operated, e.g. served, according to said RATs. Said RATs refers to the first RAT and the second RAT. The wireless device 110 may e.g. support at least GERAN and UTRAN. The wireless device 110 may thus be subject for a handover from the first RAN 101 of the first RAT to the second RAN 111 of the second RAT, e.g. from GERAN to UTRAN.

When, as mentioned above, the first RAN 101 is GERAN and the first radio network node 102 is a BSC, communication with the wireless device 110 takes place over the above-mentioned GERAN CS radio interface, via the BTS.

Attention is drawn to that FIG. 1 is only schematic and for exemplifying purpose and that not everything shown in the figure is required for all embodiments herein, as will be evident from the below. Also, a wireless communication network that in reality corresponds to the wireless communication network 100 typically comprises one or more core networks, several further network nodes, base stations, cells etc., as realized by the skilled person, but which are not shown herein for simplicity. The cellular radio system 100 may comprises a number of BSS, whereof only one correspond to the radio network node 102 shown in the simplified view in FIG. 1. Further, the cellular radio system 100 may comprise multiple BSCs and other types of central nodes.

Figure 2:
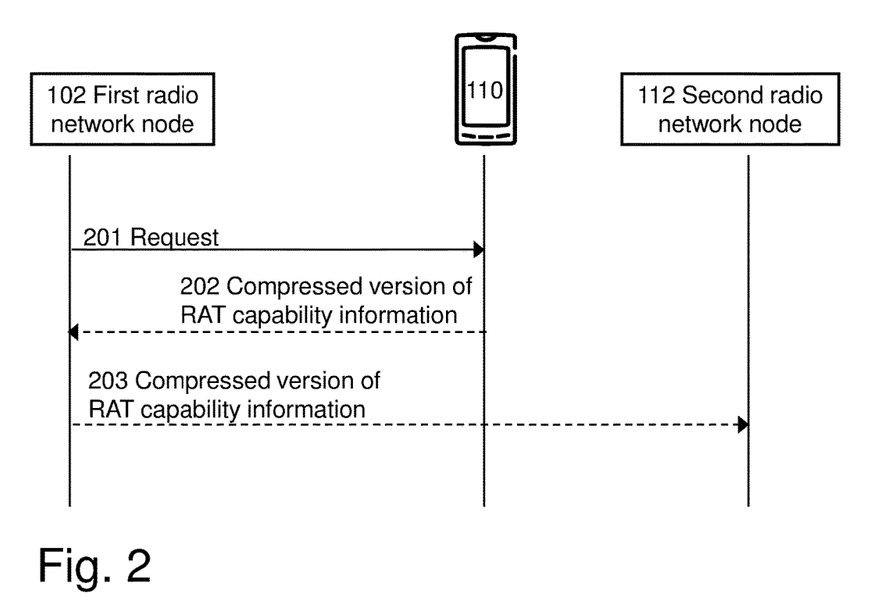
FIG. 2 schematically depicts a combined signaling diagram and flowchart describe embodiments herein.

FIG. 2 schematically depicts a combined signaling diagram and flowchart and will be used to describe embodiments herein relating to a method, performed by the first radio network node 102, for supporting a handover of the wireless device 110 from the first RAN 101 of the first RAT to the second RAN 111 of the second RAT. The handover may result in that the wireless device 110 becomes served by the second radio network node 112 in a cell of the second RAN 111 instead of being served by the first radio network node 102 in a cell of the first RAN 101.

The method comprises the following actions, which actions may be taken in any suitable order and/or be carried out fully or partly overlapping in time when this is possible and suitable.

Action 201

For example in order to instruct the wireless device 110 to perform action 202, the first radio network node 102 sends, to the wireless device 110, a request to return a compressed version of UE RAT capability information, and the wireless device 110 receives this request. The UE RAT capability information is associated with the wireless device 110 and at least one of the first RAT and the second RAT.

In general, RAT capability information, e.g. UE RAT capability information, may refer to general mobile station characteristics, e.g. of the wireless device 110, which might affect the manner in which the network of a specific RAT, e.g. the first RAN 101 of the first RAT, handles the operation of a mobile station, e.g. the wireless device 110. It the present context the RAT capability information may thus relate to information regarding the capability of the wireless device 110 to operate and/or be operated according to a specific RAT, e.g. according to UMTS/UTRA.

By compressed version of the RAT capability information is herein meant a version of smaller total data size than an uncompressed version of the RAT capability information.

In a detailed example, the first RAN 101 is a GERAN, the first radio network node 102 is a BSC, the second RAN 111 is a UTRAN and the second radio network node 112 is a RNC. The first network node 102 is configured to send the request to the multi-RAT wireless device 110, supporting GERAN and UTRAN, for the compressed version of the INTER RAT HANDOVER INFO (i.e. the INTER RAT HANDOVER INFO message containing the UE Radio Access Capability Compressed IE, i.e compressed UE UTRA capabilities, as defined in TS 25.331, version 11.4.0, in the Classmark interrogation procedure (see section 3.4.11 in TS 44.018, version 11.3.0) in order to prepare an inter-RAT handover to UTRAN.

The first radio network node 102 may start the Classmark interrogation procedure in order to prepare the inter-RAT handover to UTRAN, e.g. when receiving a MEASUREMENT REPORT from the wireless device 110, containing measurement results from one or more UTRA cell(s). The first RAN 101, e.g. the first radio network node 102 may initiate the Classmark interrogation procedure by sending a CLASSMARK ENQUIRY message to the wireless device 110 on a main Dedicated Control Channel (DCCH), containing a Classmark Enquiry Mask IE, see table 1a below, extracted from section 9.1.12 in 3GPP TS 44.018, version 11.3.0.

The Classmark Enquiry Mask IE, may be modified so that the wireless device 110 may be requested to return a compressed version of the INTER RAT HANDOVER INFO in the UTRAN CLASSMARK CHANGE message to the first radio network node 102. See Tables 1a-b and Table 2, described separately below, for examples of modification. For example, when the wireless device 110 receives the CLASSMARK ENQUIRY message, in particular a CLASSMARK ENQUIRY message with the Classmark Enquiry Mask value part (bits 7-5) set to a particular value such as '001', the wireless device 110 shall return the compressed version of the INTER RAT HANDOVER INFO message. In accordance with some embodiments the compressed version of the INTER RAT HANDOVER INFO message is returned in the UTRAN CLASSMARK CHANGE message. Hence, in the present action, the wireless device 110 may receive a message with the Classmark Enquiry Mask value set to a particular value.

Note that no change may be needed to the UTRAN CLASSMARK CHANGE message since this message is already prepared for including the compressed version of the INTER RAT HANDOVER INFO message, possibly sent in the early classmark sending procedure (see TS 44.018, version 11.3.0, section 3.3.1.1.4.1). So depending on what is requested by the first radio network node 102 in the CLASSMARK ENQUIRY message, the wireless device 110 may either return a compressed or a non-compressed version of the INTER RAT HANDOVER INFO message as part of a UTRAN CLASSMARK CHANGE message.

Action 202

The wireless device 110 sends, in response to the request received in Action 201, said compressed version to the first radio network node 102 which receives it.

For example, in response to the message with the Classmark Enquiry Mask value set to said particular value, as received in action 201, the wireless device 110 may in the present action return the compressed version of the INTER RAT HANDOVER INFO message.

Action 203

The first radio network node 102 is aware of the compressed version, thanks to action 202. Thus, the first radio network node 102 may now send the compressed version to the second radio network node 112.

In a second detailed example, the compressed version is a compressed version of the INTER RAT HANDOVER INFO message and is included in the Source RNC to target RNC transparent information (UMTS) IE as part of the BSSMAP HANDOVER REQUIRED message (see section 3.2.1.9 in TS 48.008, version 11.3.0). In accordance with some embodiments herein, the present action is executed when Inter-RAT handover to UTRAN, i.e. the second RAN 111, is eventually triggered.

As mentioned under Action 201 above, Tables 1a and 1b below provide example of a CLASSMARK ENQUIRY message content and a Classmark Enquiry Mask information element comprised in the CLASSMARK ENQUIRY message, respectively, which may be modified as described below and used in implementation of embodiments herein.

TABLE 1a

CLASSMARK ENQUIRY message

| IEI | Information element | Type/Reference | Presence | Format | length |
|---|---|---|---|---|---|
| | RR management | Protocol Discriminator 10.2 | M | V | ½ |
| | Skip Indicator | Skip Indicator 10.3.1 | M | V | ½ |
| | Classmark Enquiry Message Type | Message Type 10.4 | M | V | 1 |
| 10 | Classmark Enquiry Mask | Classmark Enquiry Mask 10.5.2.7c | O | TLV | 3 |

TABLE 1b

Classmark Enquiry Mask information element

| Classmark Enquiry Mask IE | octet 1 |
|---|---|
| Length of Classmark Enquiry Mask contents T | octet 2 |
| Classmark Enquiry Mask value part T | octet 3 |

The Classmark Enquiry Mask IE, as shown in Table 1b and comprised in the CLASSMARK ENQUIRY message as shown in Table 1a, defines the information to be returned to the first radio network node 102 by the wireless device 110. The bit mask in Classmark Enquiry Mask value part defines the specific information to be returned, such as UTRAN specific information.

In the Classmark Enquiry Mask value part, a new value may be defined, for example '001', for requesting the mobile station to return a compressed version of the INTER RAT HANDOVER INFO message as defined in TS 25.331, section 10.2.16d, version 11.4.0.

An example of such change in the Classmark Enquiry Mask value part is exemplified and underlined in Table 2 below.

TABLE 2

Classmark Enquiry Mask value part

Bit 8:
0     CLASSMARK CHANGE message is requested
1     CLASSMARK CHANGE message is not requested
Bits 7-5
000     UTRAN CLASSMARK CHANGE message is requested
<u>001     UTRAN CLASSMARK CHANGE message is requested.</u>
<u>A compressed version of the INTER RAT HANDOVER INFO</u>
<u>message shall be used, see 3GPP TS 25.331.</u>
111     UTRAN CLASSMARK CHANGE message is not requested.
All other values shall not be sent. If received, they shall be interpreted as '000'.
Bit 4:
0     CDMA2000 CLASSMARK CHANGE message requested
1     CDMA2000 CLASSMARK CHANGE message not requested.
Bit 3:
0     GERAN IU MODE CLASSMARK CHANGE message requested
1     GERAN IU MODE CLASSMARK CHANGE message not requested.
Bits 2-1: spare(0).

As already indicated in the foregoing, conventionally, inter-RAT handover of a wireless device from the first RAN 101 to the second RAN 111, is supported by, before or in connection with the handover, provide a conventional, uncompressed, version of RAT capability information regarding the wireless device to the second RAN 111 and e.g. the second radio network node 112. However, the conventional, uncompressed version of the RAT capability information may cause handover failure due to problems in reaching the second network node 112 when/if the conventional, uncompressed version of the RAT capability information is too large in data size, e.g. beyond some limit. Such inter-RAT handover failure may be avoided, or at least the risk of such failure is reduced, by requesting said compressed version of RAT capability information as in embodiments herein and as discussed above in relation to FIG. 2 and Action 201-203. The compressed version of the RAT capability information is by definition of smaller data size than an uncompressed version of the same RAT capability information and may therefore be sent to and reach the second radio network node 112 in situations where the uncompressed version would not and thereby cause handover failure.

Additionally, through embodiments herein, the first radio network node 102, when being a BSC, is not required to always request for (and store) the compressed version of the INTER RAT HANDOVER INFO message (i.e. UE UTRA capabilities) in the Immediate Assignment procedure during the call establishment phase, so that Inter-RAT handover to UTRAN may be performed if eventually triggered later during the call. Instead, according to embodiments herein, the request, as in Action 201, may be sent in association with a handover but prior to the handover, i.e. prior to execution of the actual handover. For example, Action 201 may be triggered by some action that is known to precede the handover and that may eventually also trigger the actual handover.

Also, there is no need to transfer the compressed UE UTRA capabilities to a target BSC (not shown) in case of an Inter-BSC handover, e.g. within the first RAN 101 being a GERAN, just in order to later be able to perform Inter-RAT handover to UTRAN, e.g. from the target BSC. Hence, as long as the wireless device 110 moves within the same RAT, e.g. within the first RAN 101 being a GERAN and GSM, there is no need to transfer the capabilities between the involved radio network nodes.

In addition, owing to the requested compressed version of RAT capability information (i.e. UE UTRA capabilities when the second RAN 111 is UTRAN), the risk of iInter-RAT handover from the first RAN 101 being a GERAN to the second RAN 111 being a UTRAN, to fail, is reduced. As mentioned, handover failure occur if conventional, un-compressed UE UTRA capabilities are used and of such size that they cannot be sent over the GERAN CS radio interface. This risk is avoided by requesting the compressed UE UTRA capabilities from the wireless device 110 prior to, and e.g. triggered by some action relating to, an inter-RAT handover, so it may be used instead of the conventional, uncompressed version.

Further, similarly owing to the requested compressed version of the RAT capability information, the risk of failure in inter-RAT handover from GERAN to UTRAN is reduced compared to if conventional. un-compressed UE UTRA capabilities are to be sent in a BSSMAP HANDOVER REQUIRED message as discussed above. The first radio network node 102 being a BSC may request and receive the compressed UE UTRA capabilities from the wireless device 110 and then send them in a BSSMAP HANDOVER REQUIRED message to e.g. the second radio network node 112 being a RNC.

Also, similarly owing to the requested compressed version of the RAT capability information, the risk of failure in Inter-RAT handover from UTRAN to GERAN is reduced if conventional, un-compressed UE UTRA capabilities are too large to be sent from the first radio network node 101 being a (source) RNC to the second radio network node 112 being a (target) BSC, since this communication also typically takes place over the A-interface to the BSC. The first radio network node 102, i.e. source RNC in this example, does not need to send the UE UTRA capabilities to the second radio network node 112, i.e. target BSC in this example, since the BSC instead may fetch the compressed UE UTRA capabilities from the wireless device 110 prior to performing any subsequent inter-RAT handover to UTRAN. Or as an alternative, the source RNC may send compressed UE UTRA capabilities to the target BSC in the RELOCATION REQUIRED message.

Moreover, the methods and devices as described herein typically enable simple implementation in e.g. existing BSCs and existing mobile stations. For an existing mobile station, implementation may involve implementing returning the compressed version of the INTER RAT HANDOVER INFO message if requested by a new code point in the Classmark Enquiry Mask IE, e.g. by the first radio network 102 node, such as a BSC. For the first radio network 102 node, typically a BSC, implementation may simply involve addition of a code point in the CLASSMARK ENQUIRY message when requesting the compressed version of the INTER RAT HANDOVER INFO message from the wireless device 110.

Figure 3:
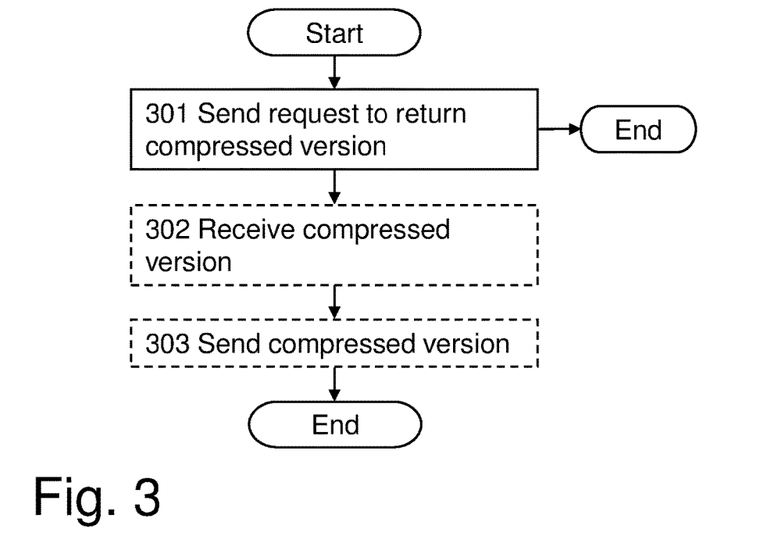
FIG. 3 is a flow chart schematically illustrating embodiments of a method, performed by a first radio network node, according to embodiments herein.

FIG. 3 is a flow chart schematically illustrating embodiments of a method, performed by the first radio network node 102, for supporting a handover of the wireless device 110 from the first RAN 101 of the first RAT, to the second RAN 111 of the second RAT that is different from the first RAT. Said RATs are supported by the wireless device 110. The first radio network node 102 is comprised in the first RAN 101 and said RANs 101, 111 are comprised in the cellular radio system 100.

The method comprises the following actions, which actions may be taken in any suitable order and/or be carried out fully or partly overlapping in time when this is possible and suitable.

Action 301

The first radio network node 102 sends, to the wireless device 110, a request to return a compressed version of RAT capability information, e.g. UE RAT capability information, which RAT capability information is associated with the wireless device 110 and at least one of the first RAT and the second RAT.

The RAT capability information may comprise information on UTRA capabilities, e.g. UE UTRA capabilities, of the wireless device 110.

The request may be associated with the handover and be sent prior to the handover.

In some embodiments, the request is comprised in a CLASSMARK ENQUIRY MASK information element included in a CLASSMARK ENQUIRY message, e.g. as discussed above.

This action may fully or partly correspond to action 201 discussed above.

Action 302

The first radio network node 102 receives, from the wireless device 110 in response to the request, said compressed version of the RAT capability information.

The compressed version of the RAT capability information may be a compressed version of an INTER RAT HANDOVER INFO message, e.g. as discussed above.

Also, the compressed version of the RAT capability information being received from the wireless device 110 may be comprised in a UTRAN CLASSMARK CHANGE message, e.g. as discussed above.

This action may fully or partly correspond to action 202 discussed above.

Action 303

The first radio network node 102 sends the compressed version to the second radio network node 112 comprised in the second RAN 111.

In some embodiments the compressed version of the RAT capability information is sent to the second radio network node 112 in response to that the handover to the second RAT has been triggered.

The compressed version of the RAT capability information being sent to the second radio network node 112 may be included in a "Source RNC to target RNC transparent information" information element being part of a HANDOVER REQUIRED message, e.g. BSSMAP HANDOVER REQUIRED as discussed above.

This action may fully or partly correspond to action 203 discussed above.

Figure 4:
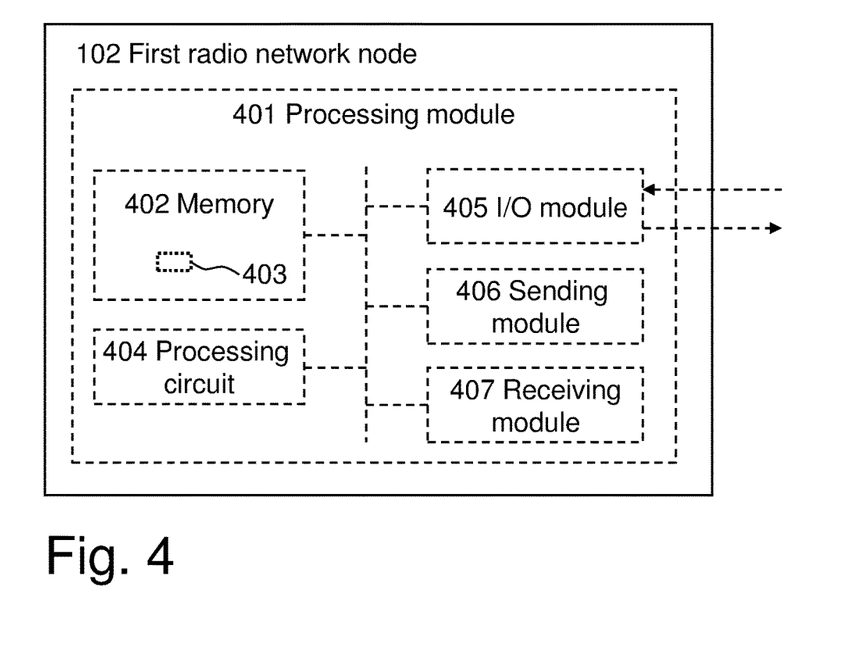
FIG. 4 is a schematic block diagram for illustrating embodiments of the first radio network node.

FIG. 4 is a schematic block diagram for illustrating embodiments of the first radio network node 102 and how the first radio network node 102 may be configured to perform the method discussed above in connection with FIG. 3, including Actions 301-303.

The first radio network node 102 may comprise a processing module 401, such as a means, one or more hardware modules, including e.g. one or more processors, and/or one or more software modules for performing the methods described herein.

The first radio network node 102 may further comprise a memory 402. The memory may comprise, such as contain or store, a computer program 403. The computer program comprises 'instructions' or 'code' directly or indirectly executable by the first radio network node 102 so that the first radio network node 102 performs the method. The memory 402 may comprise one or more memory units. The memory 402 may further be arranged to store data, such as configurations and/or applications involved in or for performing functions and actions of embodiments herein According to some embodiments herein, the processing module 401 comprises, e.g. 'is embodied in the form of' or 'realized by', a processing circuit 404 as an exemplifying hardware module. The processing circuit 404 may comprise or correspond to one or more processors. In these embodiments, the memory 402 may comprise the computer program 403 executable by the processing circuit 402, whereby the first radio network node 102 is operative, or configured, to perform the method.

Typically the first radio network node 102, e.g. the processing module 401, comprises an Input/Output (I/O) module 405 configured to be involved in, e.g. by performing, any communication to and/or from the first radio network node 102, such as sending and/or receiving information to and/or from other external nodes or devices. The I/O module 405 may be exemplified by a receiving module and/or a sending module when applicable.

In further embodiments, the first radio network node 102, e.g. the processing module 401, may comprise one or more of a sending module 406 and a receiving module 407 as exemplifying hardware and/or software module(s).

Therefore, according to the various embodiments described above, the first radio network node 102 and/or the processing module 401 and/or the sending module 406 are operative, or configured, to send, to the wireless device 110, the request to return the compressed version of the RAT capability information. The RAT capability information being associated with the wireless device 110 and at least one of the first RAT and the second RAT.

Further, the first radio network node 102 and/or the processing module 401 and/or the sending module 406 may be operative, or configured, to send the request prior to the handover.

Moreover, the first radio network node 102 and/or the processing module 401 and/or the receiving module 407 may be operative, or configured, to receive, from the wireless device 110 in response to the request, said compressed version. The first radio network node 102 and/or the processing module 401 and/or the sending module 406 may be operative, or configured, to send the compressed version to the second radio network node 112 comprised in the second RAN 111.

In some embodiments, the first radio network node 102 and/or the processing module 401 and/or the I/O module 405 may be operative, or configured, to send the compressed version to the second radio network node 112 in response to that the handover to the second RAT has been triggered.

Also, in some embodiments, the first radio network node 102 and/or the processing module 401 and/or the I/O module 405 may be operative, or configured, to receive the compressed version of the RAT capability information from the wireless device 110 in the UTRAN CLASSMARK CHANGE message.

Additionally, the first radio network node 102 and/or the processing module 401 and/or the I/O module 405 may be operative, or configured, to send the compressed version of the RAT capability information to the second radio network node 112 included in the "Source RNC to target RNC transparent information" information element being part of the HANDOVER REQUIRED message.

Figure 5A:
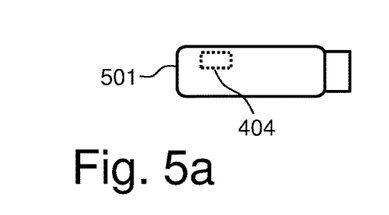
FIGS. 5a-c are schematic drawings illustrating embodiments relating to a computer program.
Figure 5B:
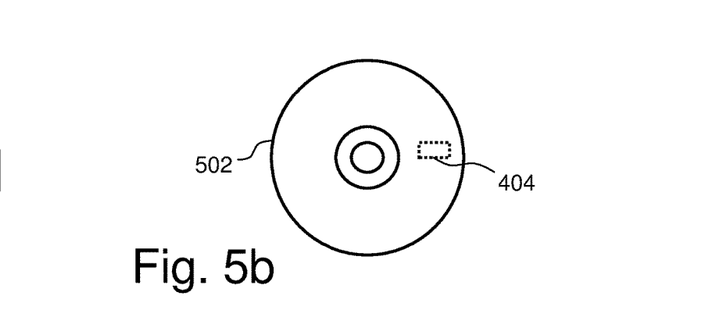
Figure 5C:
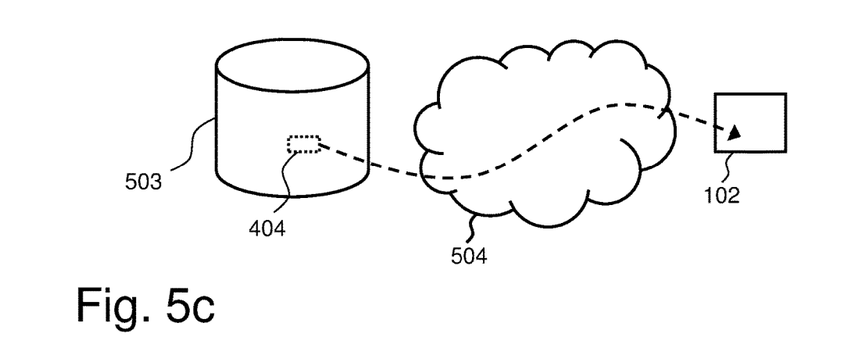

FIGS. 5*a-c* are schematic drawings illustrating embodiments relating to the computer program 404 that comprises instructions that when executed by the processing circuit 404 causes the first radio network node 102 to perform the method as described above.

In some embodiments there is provided a data carrier comprising a computer-readable medium, e.g. a computer program product, and the computer program 403 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 501 as in FIG. 5*a*, a disc storage medium 502 such as a CD or DVD as in FIG. 5*b*, a mass storage device 503 as in FIG. 5*c*. The mass storage device 503 is typically based on hard drive(s) or Solid State Drive(s) (SSD). The mass storage device 503 may be such that is used for storing data accessible over a computer network 504, e.g. the Internet or a Local Area Network (LAN).

The computer program 404 may furthermore be provided as a pure computer program or comprised in a file or files. The file or files may be stored on the computer-readable memory and e.g. available through download e.g. over the computer network 504, such as from the mass storage device 503 via a server. The server may e.g. be a web or file transfer protocol (ftp) server. The file or files may e.g. be executable files for direct or indirect download to and execution on the first radio network node 102, e.g. by the processing circuit 404, or may be for intermediate download and compilation involving the same or another processor to make them executable before further download and execution causing the first network node 102 to perform the method as described above.

Figure 6:
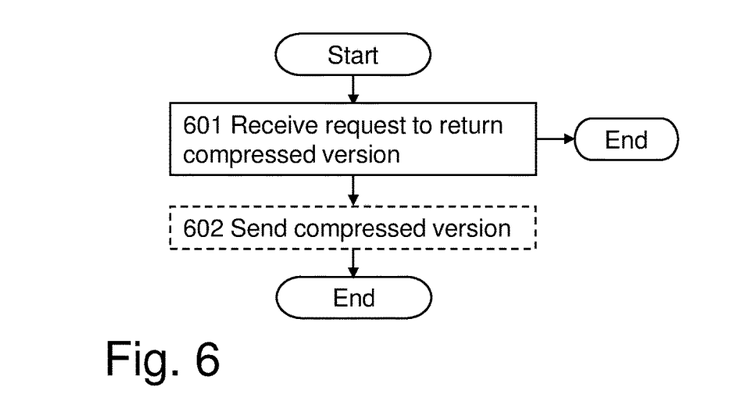
FIG. 6 is a flow chart schematically illustrating embodiments of a method, performed by a mobile station, according to embodiments herein.

FIG. 6 is a flow chart schematically illustrating embodiments of a method, performed by the wireless device 110, for supporting a handover of the wireless device 110 from a first RAN 101 of the first RAT, to the second RAN 111 of the second RAT that is different from the first RAT. As already mentioned, the RATs are supported by the wireless device 110 and the RANs 101, 111 are comprised in the cellular radio system 100.

The method comprises the following actions, which actions may be taken in any suitable order and/or be carried out fully or partly overlapping in time when this is possible and suitable.

Action 601

The wireless device 110, receives, from the first radio network node 102 comprised in the first RAN 101, a request to return a compressed version of RAT capability information. The RAT capability information being associated with the wireless device 110 and at least one of the first RAT and the second RAT.

The RAT capability information may comprises information on UTRA capabilities, e.g. UE UTRA capabilities, of the wireless device 110

The request may be associated with the handover and be received prior to the handover.

The compressed version of the RAT capability information may be a compressed version of INTER RAT HANDOVER INFO, e.g. as discussed above.

In some embodiments, the request is comprised in a CLASSMARK ENQUIRY MASK information element included in a CLASSMARK ENQUIRY MESSAGE, e.g. as discussed above.

This action may fully or partly correspond to action 201 discussed above.

Action 602

The wireless device 110 may send, in response to the received request, said compressed version to the first radio network node 102.

The compressed version of the RAT capability information being sent to the first radio network node 102 may be comprised in a UTRAN CLASSMARK CHANGE message, e.g. as discussed above.

This action may fully or partly correspond to action 202 discussed above.

Figure 7:
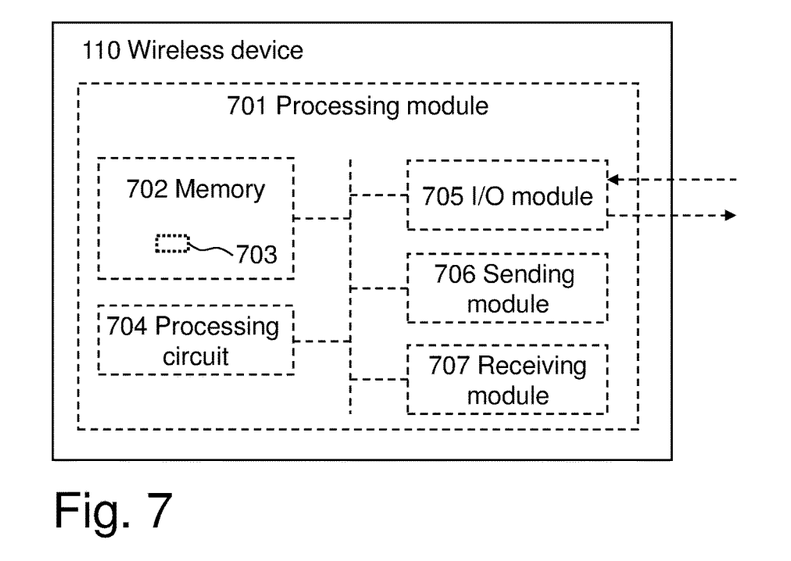
FIG. 7 is a schematic block diagram for illustrating embodiments of the mobile station.

FIG. 7 is a schematic block diagram for illustrating embodiments of wireless device 110 and how the wireless device 110 may be configured to perform the method discussed above in connection with FIG. 6, including Actions 601-602.

The wireless device 110 may comprise a processing module 701, such as a means, one or more hardware modules, including e.g. one or more processors, and/or one or more software modules for performing the method.

The wireless device 110 may further comprise a memory 702. The memory may comprise, such as contain or store, a computer program 703. The computer program 703 comprises 'instructions' or 'code' directly or indirectly executable by the wireless device 110 so that the wireless device 110 performs the method. The memory 702 may comprise one or more memory units. The memory 702 may further be arranged to store data, such as configurations and/or applications involved in or for performing functions and actions of embodiments herein According to some embodiments herein, the processing module 701 comprises, e.g. 'is embodied in the form of' or 'realized by', a processing circuit 704 as an exemplifying hardware module. The processing circuit 704 may comprise or correspond to one or more processors. In these embodiments, the memory 702 may comprise the computer program 703 executable by the processing circuit 702, whereby the wireless device 110 is operative, or configured, to perform the method.

Typically the wireless device 110, e.g. the processing module 701, comprises an Input/Output (I/O) module 705 configured to be involved in, e.g. by performing, any communication to and/or from the wireless device 110, such as sending and/or receiving information to and/or from other external nodes or devices, such as the first radio network node 102. The I/O module 705 may be exemplified by a receiving module and/or a sending module when applicable.

In further embodiments, the wireless device 110, e.g. the processing module 701, may comprise one or more of a sending module 706 and a receiving module 707 as exemplifying hardware and/or software module(s).

Therefore, according to the various embodiments described above, the wireless device 110 and/or the processing module 701 and/or the receiving module 707 are operative, or configured, to receive, from the first radio network node 102 comprised in the first RAN 101, the request to return the compressed version of the RAT capability information. The RAT capability information being associated with the wireless device 110 and at least one of the first RAT and the second RAT.

Further, the wireless device 110 and/or the processing module 401 and/or the receiving module 707 may be operative, or configured, to receive the request prior to the handover.

Moreover, the wireless device 110 and/or the processing module 401 and/or the sending module 706 may be operative, or configured, to send, in response to the received request, said compressed version to the first radio network node 102.

In some embodiments, the wireless device 110 and/or the processing module 701 and/or the sending module 706 may be operative, or configured, to send the compressed version of the RAT capability information comprised in the UTRAN CLASSMARK CHANGE message to the first radio network node 102.

Figure 8A:
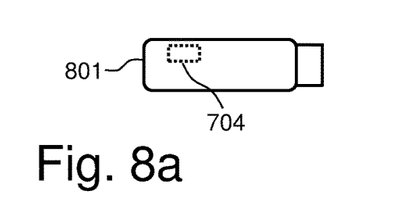
FIGS. 8a-c are schematic drawings illustrating embodiments relating to another computer program.
Figure 8B:
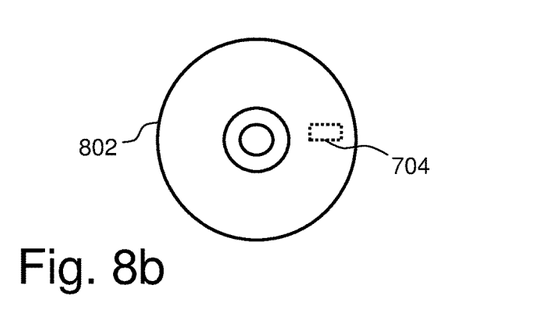
Figure 8C:
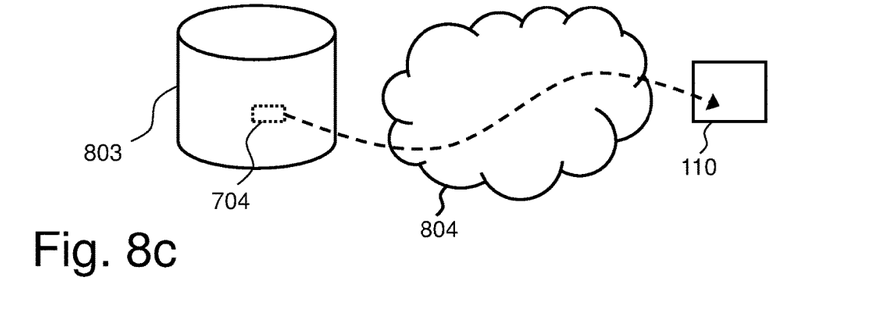

FIGS. 8a-c are schematic drawings illustrating embodiments relating to the computer program 704 that comprises instructions that when executed by the processing circuit 704 causes the wireless device 110 to perform the method as described above.

In some embodiments there is provided a data carrier comprising a computer-readable medium, e.g. a computer program product, and the computer program 703 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 801 as in FIG. 8a, a disc storage medium 802 such as a CD or DVD as in FIG. 8b, a mass storage device 803 as in FIG. 8c. The mass storage device 803 is typically based on hard drive(s) or Solid State Drive(s) (SSD). The mass storage device 803 may be such that is used for storing data accessible over a computer network 804, e.g. the Internet or a Local Area Network (LAN).

The computer program 803 may furthermore be provided as a pure computer program or comprised in a file or files. The file or files may be stored on the computer-readable memory and e.g. available through download e.g. over the computer network 804, such as from the mass storage device 803 via a server. The server may e.g. be a web or file transfer protocol (ftp) server. The file or files may e.g. be executable files for direct or indirect download to and execution on the wireless device 110, e.g. by the processing circuit 704, or may be for intermediate download and compilation involving the same or another processor to make them executable before further download and execution causing the wireless device 110 to perform the method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first radio network node 102 and/or the wireless device 110 to be configured to and/or to perform the above-described methods, respectively.

The term "radio network node" may refer to any type of network node serving a wireless device, i.e. a device for wireless communication via radio, and/or connected to other network node or network element or any radio node from where such wireless device receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, Remote Radio unit (RRU), Radio Remote Head (RRH), nodes in distributed antenna system (DAS) etc.

As already indicated, the term mobile station and wireless device may e.g. refer to any type of wireless device configured to communicate with a radio network node in a wireless communication network, cellular or mobile communication system. Examples include target device, device to device UE, machine type UE or UE capable of machine to machine communication, PDA, Tablet, mobile terminal, smart phone, laptop embedded equipped (LEE), laptop mounted equipment (LME), USB dongle etc.

Embodiments herein also applies to the multi-point carrier aggregation systems.

Note that although terminology used herein may be particularly associated with certain wireless communication networks, e.g. wireless communication networks based on 3GPP, this should not be seen as limiting the scope of the embodiments herein to only certain cellular radio systems.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that terminology such as first RAN, second RAN, first network node, second network node, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a first radio network node, for supporting a handover of a wireless device from a first Radio Access Network (RAN) of a first Radio Access Technology (RAT), to a second RAN of a second RAT that is different from the first RAT, wherein the first and second RATs are supported by the wireless device, said first radio network node is comprised in the first RAN and said first and second RANs are comprised in a cellular radio system, and wherein the method comprises:
   in response to the handover of the wireless device from the first RAT to the second RAT having been triggered, sending, to the wireless device, a request to return a compressed version of RAT capability information, where said RAT capability information is associated with the wireless device and at least one of the first RAT and the second RAT;
   receiving, from the wireless device in response to the request, the compressed version of the RAT capability information; and
   sending the compressed version of the RAT capability information to a second radio network node comprised in the second RAN.

2. The method as claimed in claim 1, wherein the RAT capability information comprises information on Universal Terrestrial Radio Access (UTRA) capabilities of the wireless device.

3. The method as claimed in claim 1, wherein the request is associated with the handover and sent prior to the handover.

4. The method as claimed in claim 1, wherein the first RAN is a GSM EDGE Radio Access Network (GERAN), the first radio network node is a Base Station Controller (BSC), the second RAN is a Universal Terrestrial Radio Access Network (UTRAN), and the second radio network node is a Radio Network Controller (RNC), and the wireless device supports at least GERAN and UTRAN.

5. The method as claimed in claim 4, wherein the request is comprised in a CLASSMARK ENQUIRY MASK information element included in a CLASSMARK ENQUIRY message.

6. The method as claimed in claim 4, wherein the compressed version of the RAT capability information is a compressed version of an INTER RAT HANDOVER INFO message.

7. The method as claimed in claim 4, wherein the compressed version of the RAT capability information being received from the wireless device is comprised in a UTRAN CLASSMARK CHANGE message.

8. The method as claimed in claim 4, wherein the compressed version of the RAT capability information is sent to the second radio network node in a "Source RNC to target RNC transparent information" information element included in a HANDOVER REQUIRED message.

9. A method, performed by a wireless device, for supporting a handover of the wireless device from a first Radio Access Network (RAN) of a first Radio Access Technology (RAT) to a second RAN of a second RAT that is different from the first RAT, wherein the first and second RATs are supported by the wireless device and the first and second RANs are comprised in a cellular radio system, and wherein the method comprises:

receiving, from a first radio network node comprised in the first RAN, a request to return a compressed version of RAT capability information, which RAT capability information is associated with the wireless device and at least one of the first RAT and the second RAT, said request associated with, but being received prior to, the handover of the wireless device from the first RAT to the second RAT; and sending, in response to the received request, the compressed version of the RAT capability information to the first radio network node.

10. The method as claimed in claim 9, wherein the RAT capability information comprises information on Universal Terrestrial Radio Access (UTRA) capabilities of the wireless device.

11. The method as claimed in claim 9, wherein the first RAN is a GSM EDGE Radio Access Network (GERAN), the first radio network node is a Base Station Controller (BSC), the second RAN is an Universal Terrestrial Radio Access Network (UTRAN), and the second network node is a Radio Network Controller (RNC), wherein the wireless device supports at least GERAN and UTRAN.

12. The method as claimed in claim 11, wherein the request is comprised in a CLASSMARK ENQUIRY MASK information element included in a CLASSMARK ENQUIRY message.

13. The method as claimed in claim 11, wherein the compressed version of the RAT capability information is a compressed version of an INTER RAT HANDOVER INFO message.

14. The method as claimed in claim 11, wherein the compressed version of the RAT capability information being sent to the first radio network node is comprised in a UTRAN CLASSMARK CHANGE message.

15. A first radio network node for supporting a handover of a wireless device from a first Radio Access Network (RAN) of a first Radio Access Technology (RAT) to a second RAN of a second RAT that is different from the first RAT, wherein the first and second RATs are supported by the wireless device, said first radio network node being comprised in the first RAN and said first and second RANs being comprised in a cellular radio system, wherein the first radio network node is configured to:

in response to the handover of the wireless device from the first RAT to the second RAT having been triggered, send, to the wireless device, a request to return a compressed version of RAT capability information, wherein the RAT capability information is associated with the wireless device and at least one of the first RAT and the second RAT;

receive, from the wireless device in response to the request, the compressed version of the RAT capability information; and send the compressed version of the RAT capability information to a second radio network node comprised in the second RAN.

16. The first radio network node as claimed in claim 15, wherein the RAT capability information comprises information on Universal Terrestrial Radio Access (UTRA) capabilities of the wireless device.

17. The first radio network node as claimed in claim 15, wherein the first radio network node is configured to send the request prior to the handover.

18. The first radio network node as claimed in claim 15, wherein the first RAN is a GSM EDGE Radio Access Network (GERAN), the first radio network node is a Base Station Controller (BSC), the second RAN is a Universal Terrestrial Radio Access Network (UTRAN), and the second radio network node is a Radio Network Controller (RNC), and the wireless device supports at least GERAN and UTRAN.

19. The first radio network node as claimed in claim 18, wherein the request is comprised in a CLASSMARK ENQUIRY MASK information element included in a CLASSMARK ENQUIRY message.

20. The first radio network node as claimed in claim 18, wherein the compressed version of the RAT capability information is a compressed version of an INTER RAT HANDOVER INFO message.

21. The first radio network node as claimed in claim 18, wherein the first radio network node is configured to receive the compressed version of the RAT capability information from the wireless device in a UTRAN CLASSMARK CHANGE message.

22. The first radio network node as claimed in claim 18, wherein the first radio network node is configured to send the compressed version of the RAT capability information to the second radio network node in a "Source RNC to target RNC transparent information" information element included in a HANDOVER REQUIRED message.

23. A wireless device for supporting a handover of the wireless device from a first Radio Access Network (RAN) of a first Radio Access Technology (RAT) to a second RAN of a second RAT that is different from the first RAT, wherein the first and second RATs are supported by the wireless device, the first and second RANs are comprised in a cellular radio system, and the wireless device is configured to:

receive, from a first radio network node comprised in the first RAN, a request to return a compressed version of RAT capability information, which RAT capability information is associated with the wireless device and at least one of the first RAT and the second RAT, said request associated with, but being received prior to, the handover of the wireless device from the first RAT to the second RAT; and sending, in response to the received request, the compressed version of the RAT capability information to the first radio network node.

24. The wireless device as claimed in claim 23, wherein the RAT capability information comprises information on Universal Terrestrial Radio Access (UTRA) capabilities of the wireless device.

25. The wireless device as claimed in claim 23, wherein the first RAN is a GSM EDGE Radio Access Network (GERAN), the first radio network node is a Base Station Controller (BSC), the second RAN is a Universal Terrestrial Radio Access Network (UTRAN), and wherein the wireless device supports at least GERAN and UTRAN.

26. The wireless device as claimed in claim 25, wherein the request is comprised in a CLASSMARK ENQUIRY MASK information element included in a CLASSMARK ENQUIRY message.

27. The wireless device as claimed in claim 25, wherein the compressed version of the RAT capability information is a compressed version of an INTER RAT HANDOVER INFO message.

28. The wireless device as claimed in claim 25, wherein the wireless device is configured to send the compressed version of the RAT capability information comprised in a UTRAN CLASSMARK CHANGE message to the first radio network node.

* * * * *